United States Patent
Shi et al.

(10) Patent No.: US 11,646,017 B1
(45) Date of Patent: May 9, 2023

(54) EFFICIENT MEMORY TRANSFORMER BASED ACOUSTIC MODEL FOR LOW LATENCY STREAMING SPEECH RECOGNITION

(71) Applicant: Meta Platforms, Inc., Menlo Park, CA (US)

(72) Inventors: Yangyang Shi, Bellevue, WA (US); Yongqiang Wang, Kirkland, WA (US); Chunyang Wu, Sunnyvale, CA (US); Ching-Feng Yeh, Redmond, WA (US); Julian Yui-Hin Chan, Seattle, WA (US); Qiaochu Zhang, Tuckahoe, NY (US); Duc Hoang Le, Sunnyvale, CA (US); Michael Lewis Seltzer, Seattle, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 189 days.

(21) Appl. No.: 17/193,414

(22) Filed: Mar. 5, 2021

(51) Int. Cl.
| | |
|---|---|
| *G10L 15/16* | (2006.01) |
| *G10L 15/183* | (2013.01) |
| *G06N 3/04* | (2023.01) |
| *G10L 15/22* | (2006.01) |

(52) U.S. Cl.
CPC .......... *G10L 15/183* (2013.01); *G06N 3/0445* (2013.01); *G10L 15/16* (2013.01); *G10L 15/22* (2013.01)

(58) Field of Classification Search
CPC ................................. G10L 16/16; G10L 15/26
See application file for complete search history.

(56) References Cited

PUBLICATIONS

Vaswani, Ashish, et al. "Attention is all you need." Advances in neural information processing systems 30 (2017). (Year: 2017).*
Shi et al. "Emformer: Efficient Memory Transformer Based Acoustic Model for Low Latency Streaming Speech Recognition", [online], https://arxiv.org/pdf/2010.10759v1, published on Oct. 21, 2020. (Year: 2020).*
Bahdanau, et al., End-to-End Attention-Based Large Vocabulary Speech Recognition. in Proc. ICASSP, 2016.
Bourlard, et al., Connectionist Speech Recognition: A Hybrid Approach1994. 1994.

(Continued)

*Primary Examiner* — Jialong He
(74) *Attorney, Agent, or Firm* — Baker Botts L.L.P.

(57) ABSTRACT

In one embodiment, a method includes accessing a machine-learning model configured to generate an encoding for an utterance by using a module to process data associated with each segment of the utterance in a series of iterations, performing operations associated with an i-th segment during an n-th iteration by the module, which include receiving an input comprising input contextual embeddings generated for the i-th segment in a preceding iteration and a memory bank storing memory vectors generated in the preceding iteration for segments preceding the i-th segment, generating attention outputs and a memory vector based on keys, values, and queries generated using the input, and generating output contextual embeddings for the i-th segment based on the attention outputs, providing the memory vector to the module for performing operations associated with the i-th segment in a next iteration, and performing speech recognition by decoding the encoding of the utterance.

20 Claims, 8 Drawing Sheets

(56) References Cited

PUBLICATIONS

Chen, et al., Training Deep Bidirectional Lstm Acoustic Model for Lvcsr By A Context-Sensitive-Chunk Bptt Approach, IEEE/ACM Transactions on Audio, Speech, and Language Processing, vol. 24, Jul. 2016.
Chiu, et al., State-Of-The-Art Speech Recognition with Sequence-To-Sequence Models, in Proc. ICASSP, 2018.
Dai, et al., Transformer-XL: Attentive Language Models Beyond A Fixed-Length Context, arXiv preprint arXiv:1901.02860, 2019.
Devlin, et al., Bert: Pre-Training of Deep Bidirectional Transformers for Language Understanding, arXiv preprint arXiv:1810.04805, 2018.
Dong, et al., Self-attention aligner: A Latency-Control End-To-End Model for Asr Using Self-Attention Network and Chunk-Hopping, in Proc. ICASSP, 2019.
Dong, et al., Speech-Transformer: A No-Recurrence Sequence-To-Sequence Model for Speech Recognition, in ICASSP, 2018.
Graves, et al., Neural Turing Machines, arXiv preprint arXiv:1410.5401, 2014.
Gulati, et al., Conformer: Convolution-Augmented Transformer for Speech Recognition, arXiv preprint arXiv:12005.08100, 2020.
He, et al., Streaming End-To-End Speech Recognition for Mobile Devices, in Proc. ICASSP, 2019.
Hinton, et al., Deep Neural Networks for Acoustic Modeling in Speech Recognition, IEEE Signal processing magazine, vol. 29, 2012.
Hochreiter, et al., Long Short-Term Memory, Neural computation, vol. 9, No. 8, pp. 1735-1780, 1997.
Karita, et al., A Comparative Study on Transformer Vs Rnn In Speech Applications, arXiv preprint arXiv:1909.06317, 2019.
Kingma, et al., Adam: A Method for Stochastic Optimization, arXiv preprint arXiv:1412.6980, 2014.
Ko, et al., Audio Augmentation for Speech Recognition, in Proc. Interspeech, 2015.
Kudo, et al., SentencePiece: A Simple and Language Independent Subword Tokenizer and Detokenizer For Neural Text Processing, EMNLP, pp. 66-71, 2018.
Le, et al., From Senones To Chenones: Tied Context-Dependent Graphemes for Hybrid Speech Recognition, arXiv preprint arXiv:1910.01493, 2019.
Lei Ba, et al., Layer Normalization, arXiv preprint arXiv:1607.06450, 2016.
Lüscher, et al., RWTH ASR Systems for Lib-riSpeech: Hybrid vs Attention—w/o Data Augmentation, arXiv preprint arXiv:1905.03072, 2019.
Mohamed, et al., Deep Bidirectional Recurrent Networks Over Spectral Windows, in Proc. Automatic Speech Recognition and Understanding Workshop (ASRU), 2015.
Mohamed, et al., Transformers with Convolutional Context for Asr, arXiv preprint arXiv:1904.11660, 2019.
Moritz et al., Streaming Automatic Speech Recognition with the Transformer Model, arXiv preprint arXiv:2001.02674, 2020.
Ott, et al., Fairseq: A Fast, Extensible Toolkit for Sequence Modeling, in Proceedings of NAACL-HLT 2019: Demonstrations, 2019.
Panayotov, et al., Lib-rispeech: An Asr Corpus Based on Public Domain Audio Books, in Proc. ICASSP, 2015.
Park, et al., Specaugment: A Simple Data Augmentation Method for Automatic Speech Recognition, arXiv preprint arXiv:1904.08779, 2019.
Peddinti, et al., Low Latency Acoustic Modeling Using Temporal Convolution and Lstms, IEEE Signal Processing Letters, vol. 25, No. 3, pp. 373-377, 2017.
Povey, et al., A Time-Restricted Self-Attention Layer for Asr, in Proc. ICASSP, 2018.
Povey, et al., The Kaldi Speech Recognition Toolkit, in IEEE Workshop on Automatic Speech Recognition and Understanding, 2011.
Radford, et al., Improving Language Understanding by Generative Pre-Training, 2018.
Rae, et al., Compressive Transformers for Long-Range Sequence Modelling, arXiv preprint arXiv:1911.05507, 2019.
Raffel, et al., Exploring the Limits of Transfer Learning with a Unified Text-to-Text Transformer, arXiv preprint arXiv:1910.10683, 2019.
Sak, et al., Long Short-Term Memory Recurrent Neural Network Architectures for Large Scale Acoustic Modeling, in Proc. Interspeech, 2014.
Salazar, et al., Self-Attention Networks for Connectionist Temporal Classification in Speech Recognition, in Proceedings of ICASSP, 2019.
Sennrich, et al., Neural Machine Translation of Rare Words with Subword Units, ACL, 2016.
Shi, et al., Weak-Attention Suppression for Transformer Based Speech Recognition, in Submitted to Interspeech, 2020.
Simonyan, et al., Very Deep Convolutional Networks for Large-Scale Image Recognition, arXiv preprint arXiv:1409.1556, 2014.
Sperber, et al., Self-Attentional Acoustic Models, arXiv preprint arXiv:1803.09519, 2018.
Tian, et al., Synchronous Transformers for End-To-End Speech Recognition, arXiv preprint arXiv:1912.02958, 2019.
Tjandra, et al., Deja-vu: Double feature Presentation and Iterated Loss in Deep Transformer Networks, to appear ICASSP, 2020.
Tsunoo, et al., Transformer ASR with Contextual Block Processing, in Proc. Automatic Speech Recognition and Understanding Workshop (ASRU), 2019.
Vaswani, et al., Attention Is All You Need, in Proc. NIPS, 2017.
Vesely, et al., Sequence-Discriminative Training of Deep Neural Networks., in Inter-Speech, 2013, vol. 2013.
Wang, et al., Low Latency End-to-End Network, arXiv preprint arXiv:12003.10369, Streaming Speech Recognition with a Scout 2020.
Wang, et al., Transformer-Based Acoustic Modeling for Hybrid Speech Recognition, arXiv preprint arXiv:1910.09799, 2019.
Yeh, et al., Transformer-Transducer: End-to-End Speech Recognition with Self-Attention, arXiv preprint arXiv:1910.12977, 2019.
Zhang, et al., Fast, Simpler and More Accurate Hybrid ASR Systems Using Wordpieces, InterSpeech, 2020.
Zhang, et al., Highway Long Short-Term Memory Rims For Distant Speech Recognition, in Proc. ICASSP, 2016.
Zhang, et al., Transformer transducer: A Streamable Speech Recognition Model with Transformer Encoders and Rnn-T Loss, in Proc. ICASSP, 2020.
Zhou, et al., Syllable-Based Sequence-To-Sequence Speech Recognition with The Transformer in ManDarin Chinese, arXiv preprint arXiv:1804.10752, 2018.

* cited by examiner

EFFICIENT MEMORY TRANSFORMER BASED ACOUSTIC MODEL FOR LOW LATENCY STREAMING SPEECH RECOGNITION

TECHNICAL FIELD

This disclosure generally relates to speech recognition, and in particular relates to hardware and software for real-time speech recognition.

BACKGROUND

Speech recognition is an interdisciplinary subfield of computer science and computational linguistics that develops methodologies and technologies that enable the recognition and translation of spoken language into text by computers. It is also known as automatic speech recognition (ASR), computer speech recognition or speech to text (STT). It incorporates knowledge and research in the computer science, linguistics and computer engineering fields. Some speech recognition systems require "training" where an individual speaker reads text or isolated vocabulary into the system. The system analyzes the person's specific voice and uses it to fine-tune the recognition of that person's speech, resulting in increased accuracy. Speech recognition applications include voice user interfaces such as voice dialing (e.g. "call home"), call routing (e.g. "I would like to make a collect call"), domotic appliance control, search key words (e.g. find a podcast where particular words were spoken), simple data entry (e.g., entering a credit card number), preparation of structured documents (e.g. a radiology report), determining speaker characteristics, [2] speech-to-text processing (e.g., word processors or emails), and aircraft (usually termed direct voice input). From the technology perspective, speech recognition has a long history with several waves of major innovations. Most recently, the field has benefited from advances in deep learning and big data. The advances are evidenced by the worldwide industry adoption of a variety of deep learning methods in designing and deploying speech recognition systems.

SUMMARY OF PARTICULAR EMBODIMENTS

In particular embodiments, a computing system may use a machine-learning model for low latency streaming speech recognition that can be applied to any speech surface. To train the model, the whole utterance may be chunked into multiple segments. These segments may be processed by a series of layers sequentially. Each segment may be first combined with a right context to form a contextual segment. Such contextual segment together with a memory carryover corresponding to the previous segment from a lower layer may be then processed to generate key and value projections. An attention layer may find the attention relationships based on the key and value projections. A point-wise feed-forward network (FFN) may then process the attention results to generate the output of this layer. At the end, the output of each layer may be integrated to form a final embedding that encodes the whole utterance, which may be decoded for different speech analysis tasks. When being used for low latency streaming speech recognition, the input to the trained machine-learning model may be partial utterances (speech segments) and the model may process the segments sequentially as the speech segments come in.

In particular embodiments, the computing system may access a machine-learning model configured to generate an encoding for an utterance by using a module to process, in a series of iterations, data associated with each of a sequence of segments of the utterance. The computing system may perform, by the module, operations associated with an i-th segment during an n-th iteration. In particular embodiments, the operations may comprise receiving an input comprising (1) input contextual embeddings generated for the i-th segment in a preceding iteration and (2) a memory bank storing memory vectors generated in the preceding iteration for one or more of the segments preceding the i-th segment. The operations may additionally comprise generating attention outputs and a memory vector based on keys, values, and queries generated using the input. The operations may further comprise generating, based on the attention outputs, output contextual embeddings for the i-th segment. In particular embodiments, the computing system may provide the memory vector to the module for performing operations associated with the i-th segment in a next iteration. The computing system may further perform speech recognition by decoding the encoding of the utterance.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
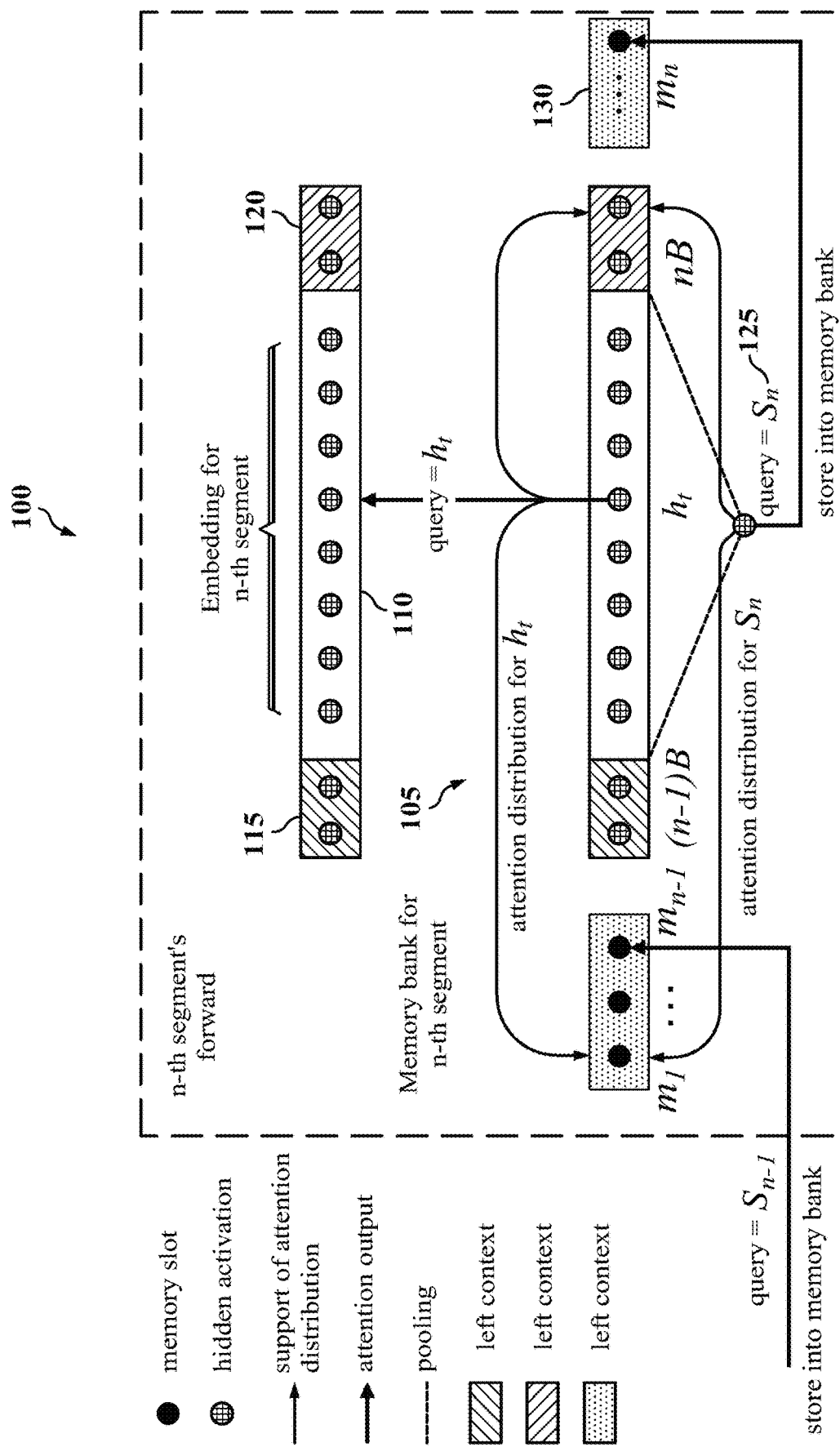
FIG. 1 illustrates an example forward step on the n-th segment using augmented memory transformer.

In particular embodiments, a computing system may use a machine-learning model for low latency streaming speech recognition that can be applied to any speech surface. To train the model, the whole utterance may be chunked into multiple segments. These segments may be processed by a series of layers sequentially. Each segment may be first combined with a right context to form a contextual segment. Such contextual segment together with a memory carryover corresponding to the previous segment from a lower layer may be then processed to generate key and value projections. An attention layer may find the attention relationships based on the key and value projections. A point-wise feed-forward network (FFN) may then process the attention results to generate the output of this layer. At the end, the output of each layer may be integrated to form a final embedding that encodes the whole utterance, which may be decoded for different speech analysis tasks. When being used for low latency streaming speech recognition, the input to the trained machine-learning model may be partial utterances (speech segments) and the model may process the segments sequentially as the speech segments come in.

In particular embodiments, the computing system may access a machine-learning model configured to generate an encoding for an utterance by using a module to process, in a series of iterations, data associated with each of a sequence of segments of the utterance. The computing system may perform, by the module, operations associated with an i-th segment during an n-th iteration. In particular embodiments, the operations may comprise receiving an input comprising (1) input contextual embeddings generated for the i-th segment in a preceding iteration and (2) a memory bank storing memory vectors generated in the preceding iteration for one or more of the segments preceding the i-th segment. The operations may additionally comprise generating attention outputs and a memory vector based on keys, values, and queries generated using the input. The operations may further comprise generating, based on the attention outputs, output contextual embeddings for the i-th segment. In particular embodiments, the computing system may provide the memory vector to the module for performing operations associated with the i-th segment in a next iteration. The computing system may further perform speech recognition by decoding the encoding of the utterance.

Transformer-based acoustic modeling has achieved great success for both hybrid and sequence-to-sequence speech recognition. However, it may require access to the full sequence, and the computational cost may grow quadratically with respect to the input sequence length. These factors may limit its adoption for streaming applications. The embodiments disclosed herein present a novel augmented memory self-attention, which may attend on a short segment of the input sequence and a bank of memories. The memory bank may store the embedding information for all the processed segments. The embodiments disclosed herein further additionally present an efficient memory transformer for low latency streaming speech recognition. In the efficient memory transformer, the long-range history context is distilled into an augmented memory bank to reduce the computation complexity in self-attention. A cache mechanism may be used to save the computation for the key and value in self-attention for the left context. The efficient memory transformer may apply a parallelized block processing training method to support for low latency training. The embodiments disclosed herein carry out experiments on benchmark Librispeech data. Under average latency 960 ms, the efficient memory transformer gets WER 2.50% on test-clean and 5.62% on test-other with decoding RTF 0.17. For a low latency scenario with an average latency of 80 ms, the efficient memory transformer achieves WER 3.01% on test-clean and 7.09% on test-other. Comparing with the LSTM baseline system with the same latency and model size, the efficient memory transformer gets relative WER reduction 9% and 16% on test-clean and test-other, respectively.

Sequence modeling is an important problem in speech recognition. In both conventional hybrid and end-to-end style (e.g., attention-based encoder-decoder or neural transducer) architectures, a neural encoder may be used to extract a sequence of high-level embeddings from an input feature vector sequence. A feed-forward neural network may extract embeddings from a fixed window of local features. Recurrent neural networks (RNNs), especially the long short-term memory (LSTM), may improve the embedding extraction by exploiting both long-term and short-term temporal patterns. Recently, attention (or self-attention if there is only one input sequence) has emerged as an alternative technique for sequence modeling. Different from RNNs, attention may connect arbitrary pairs of positions in the input sequences directly. To forward (or backward) signals between two positions that are n steps away in the input, it may only need one step to traverse the network, compared with $O(n)$ steps in RNNs. Built on top of the attention operation, the transformer model leverages multi-head attention and interleaves with feed-forward layers. It has achieved great success in both natural language processing and speech applications.

Transformers have achieved dominated performance for various tasks in natural language processing area. Rather than using memory state to capture long-range dependencies in recurrent neural networks, the multi-head self-attention method may connect arbitrary positions in the whole sequence directly in parallel. Recently, transformer-based model architectures have also been successfully applied to automatic speech recognition (ASR) area across various modeling paradigms, including sequence-to-sequence, neural transducer, connectionist temporal classification (CTC) and traditional hybrid systems.

Unlike most natural language processing tasks, many ASR applications may deal with streaming scenarios challenging for vanilla transformers. The streaming recognizer may need to produce output given partially available speech utterance rather than entire utterance. Several methods were proposed to advance the transformer for streaming speech recognition. Some works are proposed to constrain the attention computation with a limited length of look-ahead inputs. However, these methods may have a significant delay due to the look-ahead context leaking issue where essential look-ahead context grows linearly with the number of transformer layers stacking on top of one another. A scout network is proposed to detect the word boundary. In scout networks, only the context information before the word boundary may be used by the transformer to make predictions. However, the scout network may not address the heavy self-attention computation that grows quadratically with the left context lengths.

However, two issues may make transformer-based models impractical for online speech recognition applications. First, it may require access to the entire utterance before it can start producing output. Second, the computational cost and memory usage may grow quadratically with respect to the input sequence length if an infinite left context is used. There may be a few methods that can partially solve these issues. First, time-restricted self-attention can be used in which the computation of attention only uses the past input vectors and a limited length of future inputs. However, since the reception field is linearly growing for the number of transformer layers, it usually generates a significant latency and it may not address the issue of quadratically growing cost either. Second, block processing may be used to chunk the input utterances into segments, after which self-attention may be performed on each segment. In this way, the computation cost and memory usage may not grow quadratically. It may be similar to context-sensitive-chunk BPTT and truncated BLSTM, which was successfully deployed to build online speech recognition system based on BLSTM models. However, since the transformer may not attend beyond the current segment, it is observed that this method yields significant accuracy degradation. Third, recurrent connection, in which embeddings from the previous segment are carried over to the current one, may be combined with the block processing. This approach may be similar to the idea proposed in latency controlled BLSTM (LC-BLSTM). An example of this approach may include transformer-XL, in which it can model a very long dependency on text data for language modeling. Some works have explored similar ideas for acoustic modeling.

Carrying over segment-level information may enable attention to access information beyond the current segment. A recurrent connection may compress the segment-level information into a single memory slot. For a segment that is k steps away, it may take O(k) steps to retrieve the embedding extracted from that segment. The embodiments disclosed herein first present a novel augmented memory transformer, which may accumulate the segment-level information into a memory bank with multiple memory slots. This is a streaming transformer with augmented memory (AM-TRF), which may reduce latency and the self-attention computation. Attention may be then performed over the memory bank, together with the embeddings from the current segment. In this way, all the information, regardless of whether it is in the current segment or k segments away, may be equally accessible.

AM-TRF may use a block processing method which chunks the whole utterance into multiple segments. To reduce the computation in capturing the long-range left context, AM-TRF may introduce a memory bank. Each vector in the memory bank may be an abstract embedding from the previous one segment. The long-range left context may be distilled into the memory bank. In addition to the memory bank, the direct left context block from the current segment and look-ahead context block may be used for current segment recognition. However, AM-TRF may have duplicated computations for the direct left context block in both training and decoding. The memory bank may carry over the context information from previous segments in a similar auto-regression way as recurrent neural networks. The inherent auto-regression characteristic may make AM-TRF challenging to parallelize the block processing in training.

The embodiments disclosed herein additionally an efficient memory transformer that improves the AM-TRF from the following aspects. For reference purpose, the efficient memory transformer is referred as "Emformer" through the embodiments disclosed herein. First, the efficient memory transformer (Emformer) may remove the duplicated computation from the left context block by caching the key and value in previous segments' self-attention. Second, rather than passing the memory bank within the current layer in AM-TRF, the efficient memory transformer (Emformer) may carry over the memory bank from the lower layer. Third, the efficient memory transformer (Emformer) may disable the summary vector's attention with memory bank to avoid overweighting the most left part of context information. Finally, the efficient memory transformer (Emformer) may apply a parallelized block processing training method, which is critical to train it for a low latency scenario.

To verify the performance of the efficient memory transformer (Emformer), the embodiments disclosed herein carry out experiments on Libri Speech (i.e., a public dataset). Under the average latency 640 ms constraint, comparing AM-TRF, the efficient memory transformer (Emformer) gets relative WER reduction 17% on test-clean and 9% on test-other. Meanwhile, the efficient memory transformer (Emformer) reduces the training time by almost 80% and decoding RTF by 10%. For a low latency scenario with an average latency 80 ms, the efficient memory transformer (Emformer) saves more than 91% computation from AM-TRF and obtain WER 3.01% on test-clean and 7.09% on test-other. According to our knowledge, this may be the first work to give streaming transformer results on LibriSpeech with such low latency. Under the average latency 960 ms and 640 ms constraint, the efficient memory transformer (Emformer) also gives the best result on Libri Speech so far.

Given an input embedding sequence $X=(x_1, \ldots, x_T)$ where $x_t \in \mathbb{R}^D$, self-attention may project the input to query, key and value space using $W_q$, $W_k$ and $W_v$, respectively, $$Q=W_q X, K=W_k X, V=W_v X \quad (1)$$

where $W_q$, $W_k$, $W_v$, are learnable parameters. Self-attention may use dot-product to get the attention distribution over query and key, i.e., for position t in query, a distribution may be obtained by:

$$\alpha_{t_T} = \frac{\exp(\beta \cdot Q_t^T K_T)}{\sum_{T'} \exp(\beta \cdot Q_t^T K_{T'})} \quad (2)$$

where $$\beta = \frac{1}{\sqrt{D}}$$

is a scaling factor. Given $\alpha_t$, the output embedding of self-attention may be obtained via:

$$z_t = \Sigma_T \text{Dropout}(\alpha_{t_T}) \cdot V_T \quad (3)$$

In prior conventional work, multiple head attentions are introduced. Each of the attention head may be applied individually on the input sequences. The output of each head may be concatenated and linearly transformed into the final output.

The transformer-based acoustic model may be a deep stack transformer layers on top of VGG blocks. Each transformer layer may consist of a multi-head self-attention followed by a position-wise feed-forward layer. Rather than using Sinusoid positional embedding, the transformer-based acoustic model may use VGG blocks to implicitly encode the relative positional information. The layer normalization, the iterated loss, residual connections, and dropout may be applied to train the deep stack transformer layers effectively.

The original transformer model may generate the outputs according to the attention on the whole input sequence, which may be not suitable for streaming speech recognition. The proposed augmented memory transformer may address this issue by the combination of two mechanisms. First, similar to block processing, the whole utterance may be segmented into segments padding with left context and right context. The size of each segment may limit the computation and memory consumption in each transformer layer. Second, to carry over information across segments, an augmented memory bank may be used. Each slot in the augmented memory bank may be the embedding representation of an observed segment.

FIG. 1 illustrates an example forward step 100 on the n-th segment using augmented memory transformer. An augmented memory bank 105 may be introduced to the self-attention function. The input sequence may be first segmented into segments. Each segment $C_n = (X_{nB+1}, \ldots, X_{(n+1)B})$ may contain B input embedding vectors, where B is referred to as the segment length. The n-th segment may be formed by patching the current segment 110 with left context 115 $L_n$ (length L) and right context 120 $R_n$ (length R). An embedding vector $s_n$ 125, referred to as the summarization query may be then computed by pooling over $C_n$. Different pooling methods, e.g. average pooling, max pooling, and the linear combination, may be used. As an example and not by way of limitation, the embodiments disclosed herein may focus on the average pooling. In the self-attention with augmented memory, the query may be the projection from the concatenation of current segment with context frames and the summarization query. The key and the value may be the projections from the concatenation of the augmented memory bank and the current segment with context frames. They may be formalized as $$Q = W_q[L_n, C_n, R_n, s_n], \quad (4)$$

$$K = W_k[M_n, L_n, C_n, R_n], \quad (5)$$

$$V = W_v[M_n, L_n, C_n, R_n], \quad (6)$$

where $M_n = (m_1, \ldots, m_{n-1})$ is the augmented memory bank. Note Q has (L+C+R+1) column vectors and is the projection from $s_n$. The attention output for may be stored into augmented memory bank as $m_n$ 130 for future forward steps, i.e., $$m_n = \Sigma_T \text{Dropout}(\alpha_{(-1)_T}) \cdot V_T \quad (7)$$

where $\alpha_{(-1)_T}$ is the attention weight for $q_{-1}$. The attention output from $(q_1, \ldots, q_{L+C+R})$ may be fed to the next layer, except for the last transformer layer, only the center B vectors may be used as the transformer network's output. The output for the whole utterance may be the concatenation of outputs from all the segments.

The embodiments disclosed herein may be different to existing models in a variety of aspects. Transformer-XL incorporates history information only from previous segment $C_{n-1}$ via $$Q = W_q C_n,$$

$$K = W_k[C_{n-1}, C_n], V = W_v[C_{n-1}, C_{n-1}] \quad (8)$$

Also note that, in transformer-XL, $C_{n-1}$ is from the lower layer. This may make the upper layers have an increasing long reception field. Our proposed augmented memory transformer may explicitly hold the information from all the previous segments (Eq. (5) and (6)) and all the layers may have the same reception field. Using a bank of memories to represent past segments is also explored in conventional work, primarily in language modeling tasks. In one conventional work, the time-restricted transformer restricts the attention to a context window in each transformer layer. This may mean the lookahead length is linearly growing by the number of transformer layers. Our proposed method may have a fixed look-ahead window, thus enable us to use many transformer layers without increasing look-ahead window size.

Figure 2A:
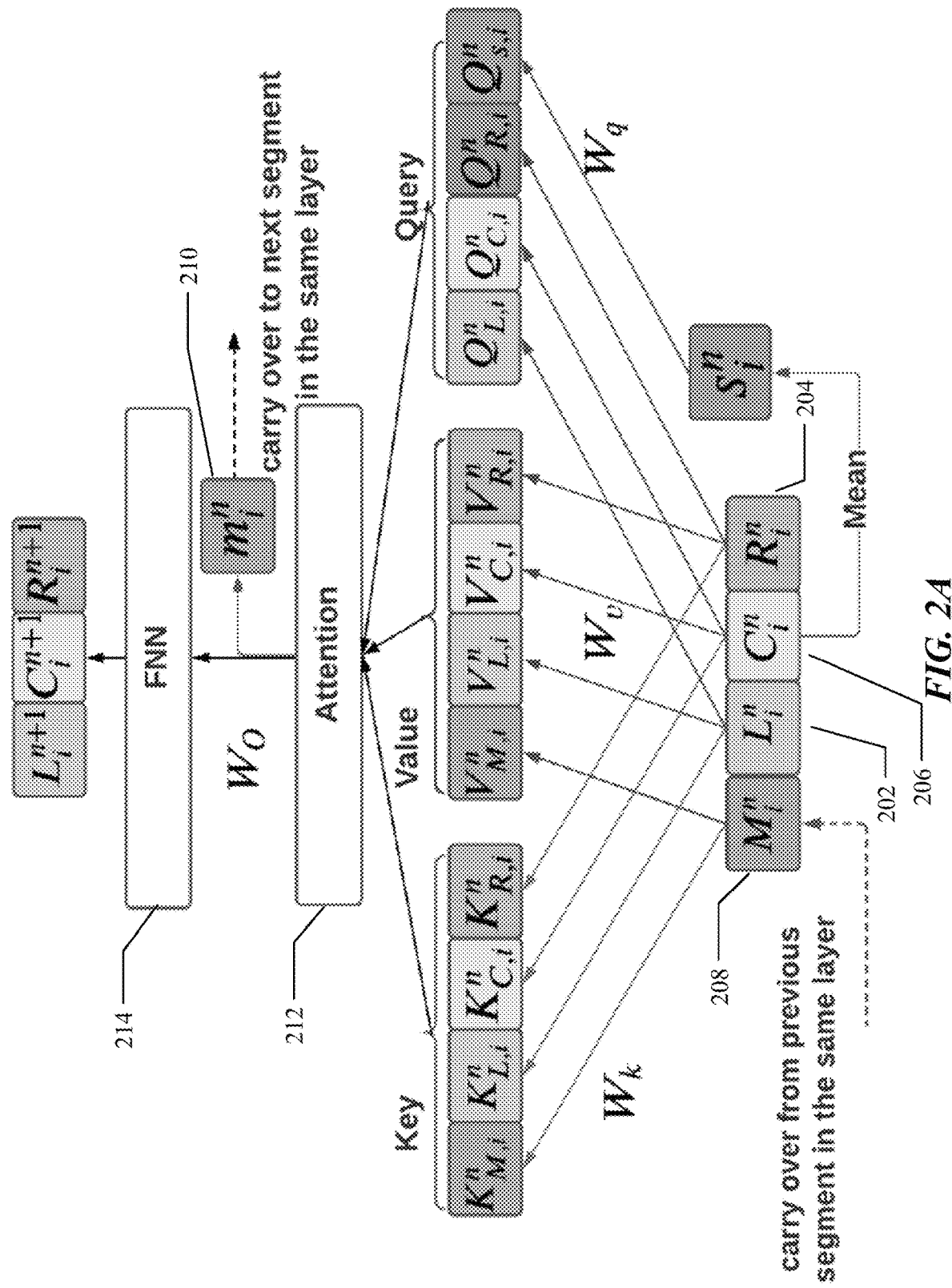
FIG. 2A illustrates example operations in one AM-TRF layer.
Figure 2B:
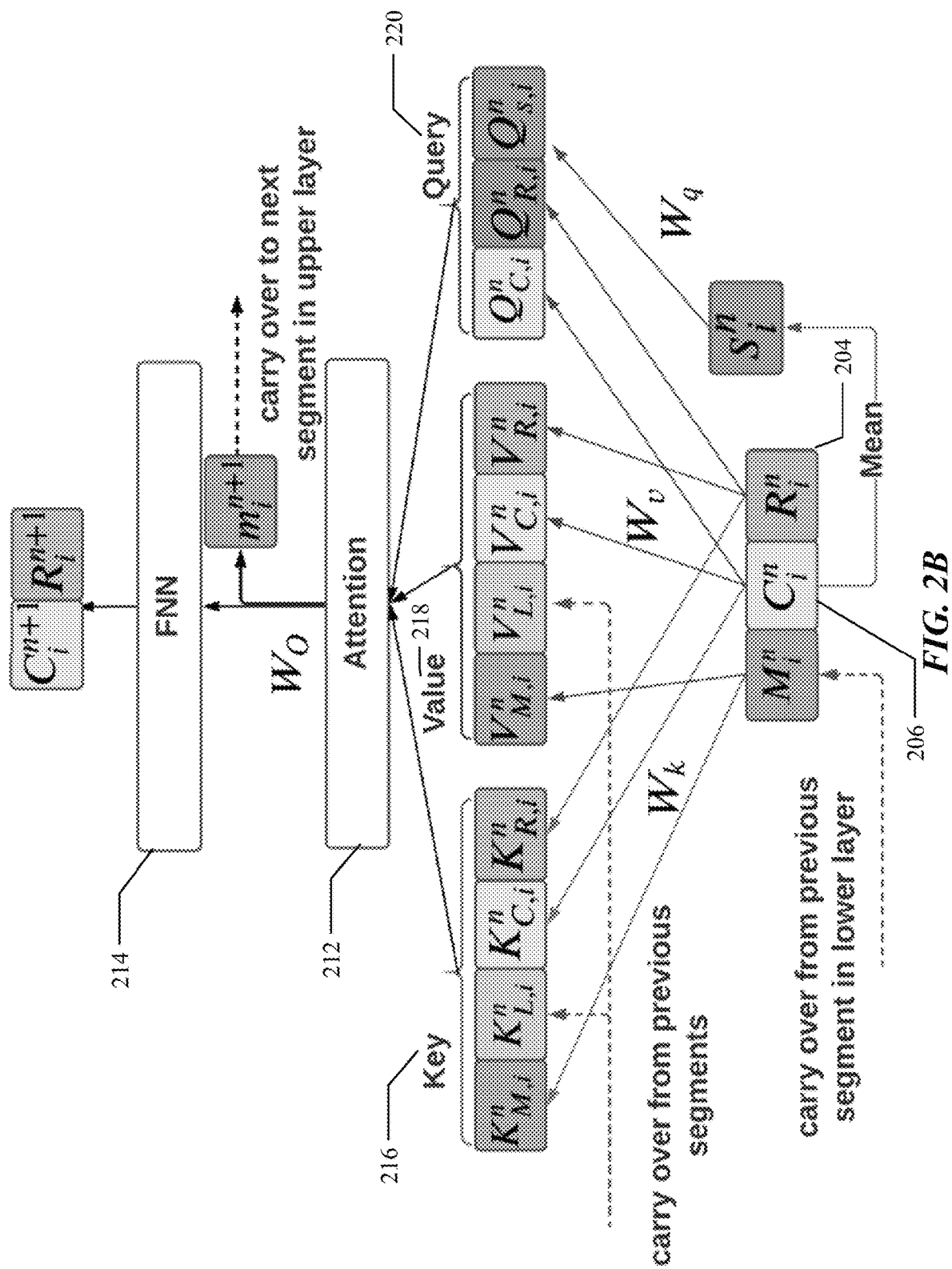
FIG. 2B illustrates an example layer of the efficient memory transformer.

FIGS. 2A-2B illustrate an example comparison between the augmented memory transformer (AM-TRF) and the efficient memory transformer (Emformer). FIG. 2A illustrates example operations in one AM-TRF layer. A sequence of input feature vectors may be chunked into multiple nonoverlapping segments $C_1^n, \ldots, C_i^n$, where the i denotes the index of segment, and n denotes the layer's index. In order to reduce boundary effect, left and right contextual blocks, $L_i^n$ 202 and $R_i^n$ 204, may be concatenated with $C_i^n$ 206 to form a contextual segment $X_i^n = [L_i^n, C_i^n, R_i^n]$. At the i-th segment, the n-th AM-TRF layer may accept $X_i^{n+1}$ and a bank of memory vector $M_i^n = [m_1^n, \ldots, m_{i-1}^n]$ 208 as the input, and produce $X_i^{n+1} = [L_i^{n+1}, C_i^{n+1}, R_i^{n+1}]$ and $m_i^n$ 210 as the output, whereas $X_i^{n+1}$ may be fed to the next layer and $m_i^n$ 210 may be inserted into the memory bank to generate $M_{i+1}^n$ and carried over to the next segment. After all the AM-TRF layers, the center blocks $$\{C_i^{N-1}\}_{i=0}^{I-1}$$

may be concatenated as the encoder output sequence; the contextual blocks $$\{L_i^{N-1}\}_{i=0}^{I-1} \text{ and } \{R_i^{N-1}\}_{i=0}^{I-1}$$

may be discarded.

At the core of each AM-TRF layer, there may be a modified attention mechanism 212 which attends to the memory bank and yields a new memory vector at each segment:

$$\hat{X}_i^n = \text{LayerNorm}(X_i^n) \quad (9)$$

$$K_i^n = W_k[M_i^n, \hat{X}_i^n], \quad (10)$$

$$V_i^n = W_v[M_i^n, \hat{X}_i^n], \quad (11)$$

$$[Z_{L,i}^n, Z_{C,i}^n, Z_{R,i}^n] = \text{Attn}(W_q \hat{X}_i^n, K_i^n, V_i^n) + X_i^n \quad (12)$$

$$m_i^n = \text{Attn}(W_q s_i^n, K_i^n, V_i^n) \quad (13)$$

whereas $Z_{L,i}^n$, $Z_{C,i}^n$, and $Z_{R,n}^i$ are the attention output for $L_n^i$, $C_n^i$ and $R_n^i$ respectively; $s_i^n$ is the mean of center block $C_i^n$; Attn (q; k; v) is the attention operation with q, k and v being the query, key and value, respectively.

$Z_{L,i}^n$, $C_{C,i}^n$, $Z_{R,n}^i$ may be passed to a point-wise feed-forward network (FFN) 214 with layer normalization and residual connection to generate the output of this AM-TRF layer, i.e., $$\hat{X}_i^n = \text{FFN}(\text{LayerNorm}([Z_{L,i}^n, Z_{C,i}^n, Z_{R,i}^b])) \quad (14)$$

$$X_i^{n+1} = \text{LayerNorm}(\hat{X}_i^{n+1} + [Z_{L,i}^{n,Z}, C_{C,i}^n, Z_{R,i}^n]) \quad (15)$$

Usually FNN may be a two-layer feed-forward network with ReLU nonlinearity being used. Note that the last layer normalization in Eq. (15) may be needed to prevent a path to bypass all the AM-TRF layers.

Given the similar latency constraint, AM-TRF has outperformed previous streaming transformer models. However, there may be several issues with AM-TRF. The usage of the left context may be not efficient. AM-TRF training may rely on the sequential block processing that is not suitable for low latency model training. Having observed these limitations, the embodiments disclosed herein further propose a new streamable transformer architecture, which is an efficient memory transformer (Emformer). FIG. 2B illustrates an example layer of the efficient memory transformer (Emformer). As illustrated in FIG. 2A, for the i-th segment, the embedding of the left context $L_i^n$ 202 may need to be re-computed for every layer, even though $L_i^n$ 202 is overlapped with $C_{i-1}^n$ (or possibly even more previous center blocks). Thus, we may only need to cache the projections from the previous segment. In particular embodiments, the input contextual embeddings for the i-th segment during the n-th iteration may comprise an embedding representing the i-th segment generated in the preceding iteration and an embedding representing a right context block associated with the i-th segment generated in the preceding iteration. In particular embodiments, the keys may comprise at least a key carried over from one or more segments preceding the i-th segment and the values may comprise at least a value carried over from one or more segments preceding the i-th segment. As shown in FIG. 2B, the efficient memory transformer (Emformer) may only compute the key 216, value 218 projections for the memory bank, center, and right context; the efficient memory transformer (Emformer) may save the computation of query 220 projection of left context, as it may not need to give output from the left context block for the next layer. Compared with AM-TRF, the attention part 212 in the efficient memory transformer (Emformer) may operate in the following sequence:

$$[\hat{C}_i^n, \hat{R}_i^n] = \text{LayerNorm}([C_i^n, R_i^n]) \quad (16)$$

$$K_i^n = [W_k M_i^n, K_{L,i}^n, W_k C_i^n, W_k R_i^n] \quad (17)$$

$$V_i^n = [W_v M_i^n, V_{L,i}^n, W_v C_i^n, W_v R_i^n] \quad (18)$$

$$Z_{C,i}^n = \text{Attn}(W_q \hat{C}_i^n, K_i^n, V_i^n) + C_i^n \quad (19)$$

$$Z_{R,i}^n = \text{Attn}(W_q \hat{R}_i^n, K_i^n, V_i^n) + R_i^n \quad (20)$$

$$m_i^n = \text{Attn}(W_q s_i^n; K_i^n, V_i^n) \quad (21)$$

where $K_{L,i-1}^n$ and $V_{L,i-1}^n$ are the key 216 and value 218 copies from previous segments with no additional computations.

In particular embodiments, generating the output contextual embeddings may be based on a point-wise feed-forward network 214. $Z_{C,i}^n$, $Z_{R,i}^n$ may be passed to a point-wise feed-forward network (FFN) 214 with layer normalization and residual connection to generate the output of this Emformer layer, i.e., $$\hat{X}_i^n = \text{FFN}(\text{LayerNorm}([Z_{C,i}^n, Z_{R,i}^n])) \quad (22)$$

$$X_i^{n+1} = \text{LayerNorm}(\hat{X}_i^{n+1} + [Z_{C,i}^n, Z_{R,i}^n]) \quad (23)$$

Let's assume L, C, R, and M are the left context block length, the center context length, the right context length, and the memory bank length; the number of heads in the multi-head self-attention is h and per head dimension is d. In particular embodiments, the computing system may generate a summary vector for the i-th segment during the n-th iteration. Note the summary vector is the mean of the center segment, of which length is always 1. In other words, the summary vector may be based on a mean of the i-th segment. The embodiments disclosed herein may use up-sample factor 4. In other words, the hidden layer dimension in FFN may be 4 dh. In practice, the memory bank may be implemented in ring buffer way with small length, and the model dimension, dh, may be much larger than any of L, C, R, and M. So approximately, the efficient memory transformer (Emformer) may save approximately $$\frac{L}{L + C + R}$$

of AM-TRF computation. For low latency scenario with center context length 80 ms, right context length 40 ms, and left context length 1280 ms, the efficient memory transformer (Emformer) may reduce more than 91% computation from AM-TRF.

The attention output from the summary vector $s_i^n$ may be a memory vector in the memory bank. The memory bank may carry all the previous context information for future segments. As we can see from FIG. 2A, the memory vector $m_i^n$ from the i-th segment in the n-th layer may be required for the (i+1)-th segment from the same layer. In training, the auto-regression characteristic of AM-TRF may force the block processing to be in a sequential way that may be not suitable for GPU computing. Especially for low latency model training, where the center segment is small, sequential block processing may chunk the whole utterance computation into a small computation loop, which may render extremely low GPU usage.

To support parallelization for block processing training, the efficient memory transformer (Emformer) may take the memory bank input from previous segments in the lower layer rather than the same layer. In this way, for each layer in the efficient memory transformer, the whole sequence may be trained in parallel, fully taking advantage of the GPU computing resources.

According to Eq. (13), the memory vector may be a weighted interpolation of values projected from the memory bank, the left context block, the center block, and the right context block. In particular embodiments, the computing system may assign a zero attention-weight between the summary vector and the memory bank. For both AM-TRF and the efficient memory transformer (Emformer), assigning the attention weight between the summary vector and the memory bank to zero may stabilize the training and improve recognition accuracy for long-form speech. There may be two issues by including the memory bank information in the current memory vector. The most left context information may be over-weighted because it is contained in every memory vector in the memory bank. The other one may be similar to a recurrent neural network, where a recurrent connection of the memory bank with a memory vector could cause gradient vanishing or explosion. For AM-TRF, the usage of the weak-attention suppression method partially addresses the problem by setting weak-attention weights to zero.

Figure 3:
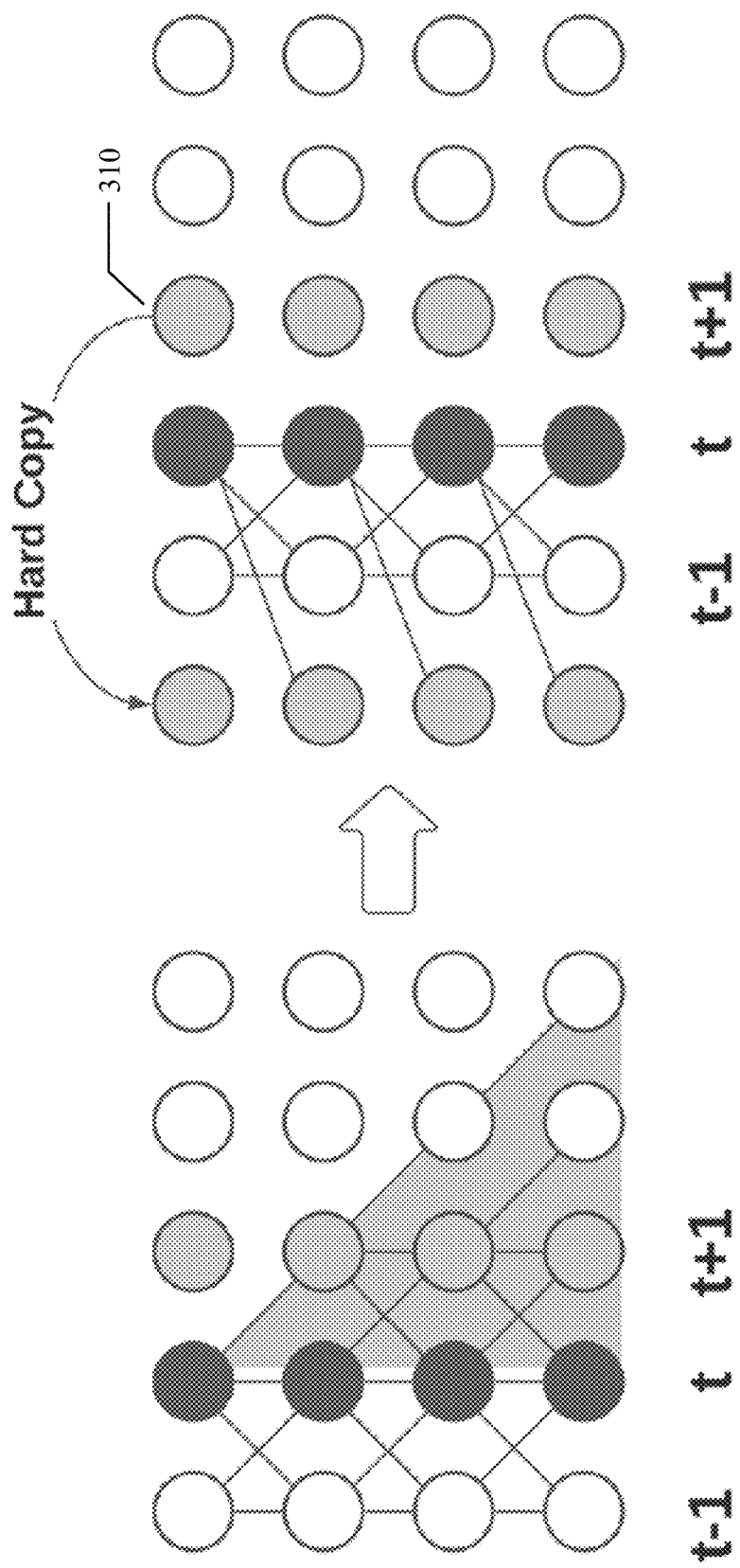
FIG. 3 illustrates an example approach of avoiding look-ahead context leaking.

The sequential block processing in AM-TRF training may chunk the input sequence physically. The right context size may bound the look-ahead reception field. However, processing blocks sequentially may significantly slow the training. Now the efficient memory transformer (Emformer) may process the input sequence in a fully parallel manner in the training stage. The efficient memory transformer (Emformer) may apply attention masks to limit the reception field in each layer without physically chunking the input sequence. However, this method may have the risk of a look-ahead of context leaking. FIG. 3 illustrates an example approach of avoiding look-ahead context leaking. As shown in the left part of FIG. 3, even the look-ahead context size is limited to 1 in each layer, the total look-ahead context size is 4 when four layers of the efficient memory transformer (Emformer) are used. To deal with the look-ahead context leaking issue in training, the efficient memory transformer (Emformer) may make a hard copy of each segment's look-ahead context 310 and put the look-ahead context copy at the beginning of the input sequence. In other words, the computing system may make a copy of the embedding representing the right context block and put the copy at a beginning of the received input.

Figure 4:
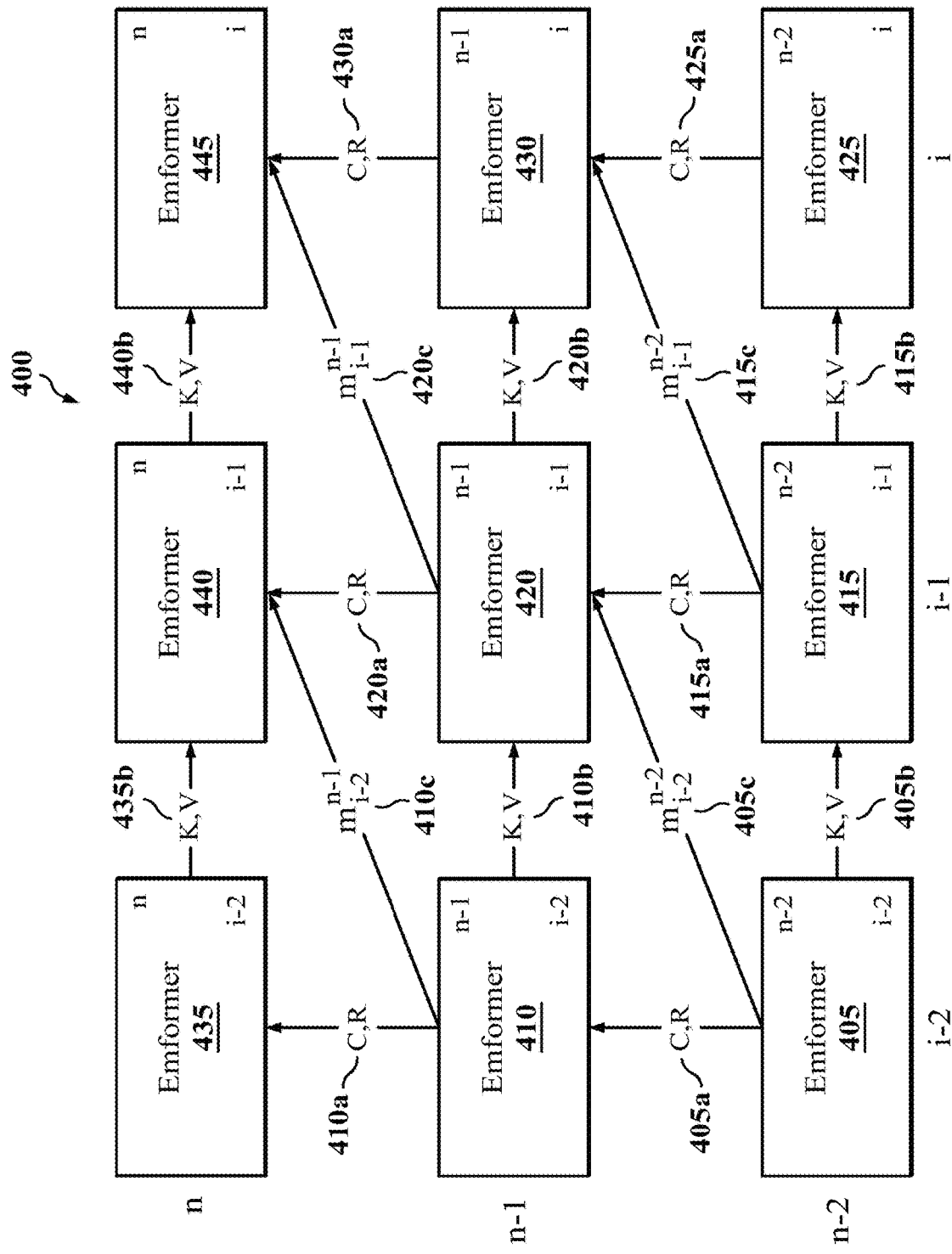
FIG. 4 illustrates an example architecture of using multiple efficient memory transformers with multiple layers.

FIG. 4 illustrates an example architecture 400 of using multiple efficient memory transformers with multiple layers. In particular embodiments, the output contextual embeddings for the i-th segment during the n-th iteration may comprise an embedding representing the i-th segment generated in the n-th iteration and an embedding representing a right context block associated with the i-th segment generated in the n-th iteration. The output contextual embeddings for the i-th segment during the n-th iteration may become input contextual embeddings for the i-th segment during the next iteration. After the n-th iteration, the computing system may update the memory bank by adding the memory vector generated during the n-th iteration. In particular embodiments, the bank of memory vector $M_i^n=[m_1^{n-1}, \ldots, m_{i-1}^{n-1}]$. As illustrated in FIG. 4, the (i−2)-th segment may be processed by Emformer 405 at the (n−2)-th layer (iteration). The output C, R 405a from Emformer 405 may be provided to Emformer 410 which processes the (i−2)-th segment at the (n−1)-th layer. The output K, V 405b from Emformer 405 may be provided to Emformer 415 which processes the (i−1)-th segment at the (n−2)-th layer. The output $m_{i-2}^{n-2}$ 405c from Emformer 405 may be provided to Emformer 420 which processes the (i−1)-th segment at the (n−1)-th layer. The output C, R 415a from Emformer 415 may be provided to Emformer 420 which processes the (i−1)-th segment at the (n−1)-th layer. The output K, V 415b from Emformer 415 may be provided to Emformer 425 which processes the i-th segment at the (n−2)-th layer. The output $m_{i-1}^{n-2}$ 415c from Emformer 415 may be provided to Emformer 430 which processes the i-th segment at the (n−1)-th layer. The output C, R 425a from Emformer 425 may be provided to Emformer 430 which processes the i-th segment at the (n−1)-th layer. The output C, R 410a from Emformer 410 may be provided to Emformer 435 which processes the (i−2)-th segment at the n-th layer. The output K, V 410b from Emformer 410 may be provided to Emformer 420 which processes the (i−1)-th segment at the (n−1)-th layer. The output $m_{1-2}^{n-1}$ 410c from Emformer 410 may be provided to Emformer 440 which processes the (i−1)-th segment at the n-th layer. The output C, R 420a from Emformer 420 may be provided to Emformer 440 which processes the (i−1)-th segment at the n-th layer. The output K, V 420b from Emformer 420 may be provided to Emformer 430 which processes the i-th segment at the (n−1)-th layer. The output $m_{i-1}^{n-1}$ 420c from Emformer 420 may be provided to Emformer 445 which processes the i-th segment at the n-th layer. The output C, R 430a from Emformer 430 may be provided to Emformer 445 which processes the i-th segment at the n-th layer. The output K, V 435b from Emformer 435 may be provided to Emformer 440 which processes the (i−1)-th segment at the n-th layer. The output K, V 440b from Emformer 440 may be provided to Emformer 445 which processes the i-th segment at the n-th layer.

Figure 5:
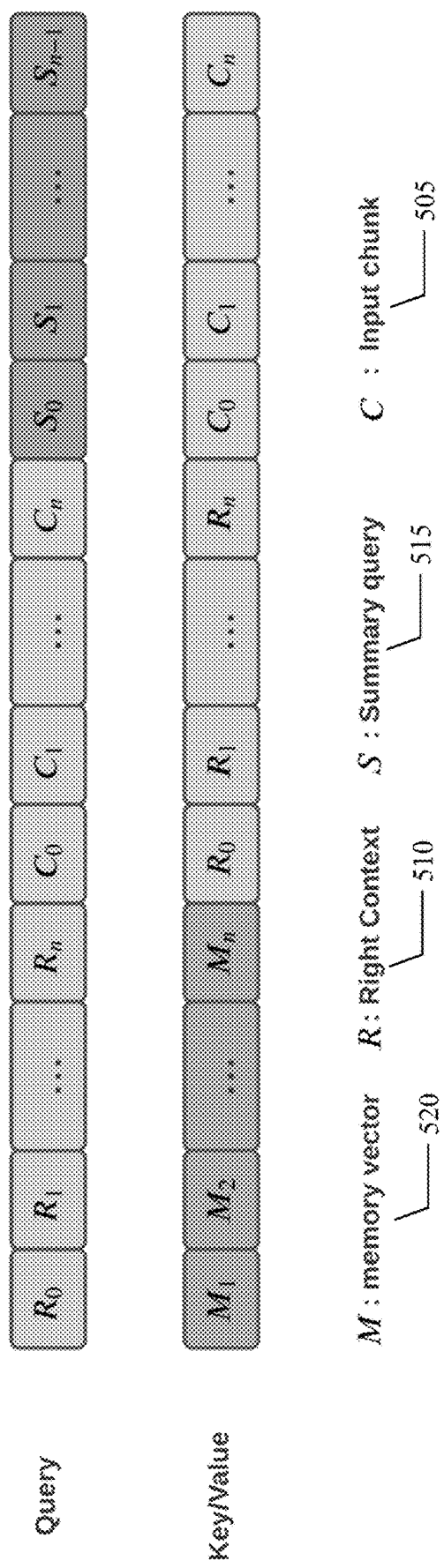
FIG. 5 illustrates an example formulation of query, key, and value.

FIG. 5 illustrates an example formulation of query, key, and value. In particular embodiments, the efficient memory transformer (Emformer) may be used as follows to generate the final output after an input sequence of segments have been processed by the N layers of efficient memory transformers during the training. Generating the encoding for the utterance may comprise the following steps. First, after the series of iterations, the computing system may identify, from output contextual embeddings for each segment of the utterance, an embedding representing the segment. Then the computing system may combine the identified embeddings of the segments of the utterance. Given the very first input sequence $[C_0, \ldots, C_n]$ 505, the embodiments disclosed herein may pad all the right context $[R_0, \ldots, R_n]$ 510 at the beginning and summary vector $[S_0, \ldots, S_{n-1}]$ at the end, which may result in the query. The key/value part may take the input sequence as $[M_0, \ldots, M_n]$ $[R_0, \ldots, R_n]$ $[C_0, \ldots C_n]$ in which $[M_0, \ldots, M_n]$ represents the memory vector 520. The output from the N layers may be is $[R_0^N, \ldots, R_n^N]$ $[C_0^N, \ldots, C_n^N]$. The $[C_0^N, \ldots, C_n^N]$ may be used as the final output from the N layers.

In particular embodiments, when used in decoding, the efficient memory transformer (Emformer) may get input gradually. As a result, the efficient memory transformer (Emformer) may generate out gradually such as $[R_0^N, C_0^N], \ldots, [R_n^N, \ldots, C_n^N]$ where only $C_0^N, \ldots, C_n^N$ may be really sent out and concatenated together as final output. In particular embodiments, the efficient memory transformer (Emformer) may be one component in the whole decoder. As an example and not by way of limitation, the efficient memory transformer (Emformer) may correspond to one of the acoustic models in a decoder based on a traditional hybrid system. The decoder may need to decode the input sequence segment by segment.

The embodiments disclosed herein verify the proposed method on the LibriSpeech corpus. Libri Speech has 1000 hours of book reading utterances derived from the LibriVox project. There are two subsets of development data and evaluation data in LibriSpeech. The "clean" subsets contain simple and clean utterances. The "other" subset contains complex and noisy utterances. Based on the WER on the dev data, we select the best model and report its WER on test data. The official provided 4-gram language model is used for hybrid model decoding. In the experiments, the efficient memory transformer (Emformer) is used as an encoder for both the hybrid and transducer models.

The context and positional dependent graphemes are used as output units. The standard Kaldi LibriSpeech recipe is used to build bootstrap the HMM-GMM system. The 80-dimensional log Mel filter bank features at a 10 ms frame rate are used. The embodiments disclosed herein also apply speed perturbation and SpecAugment without time warping to stabilize the training. To effectively train the efficient memory transformer (Emformer), the training utterances are chunked into less than 10 seconds using forced alignment results from an existing latency controlled BLSTM acoustic model.

In the efficient memory transformer (Emformer), each layer has eight heads of self-attention. The input and output for each layer have 512 nodes. The inner layer of FFN has dimensionality 2048. Dropout is 0.1 for all layers across all experiments. An auxiliary incremental loss with weight 0.3 is used to overcome the training divergence issue for deep transformer models. All hybrid models are trained with the Adam optimizer using 180 epochs. The learning rate increase to 1e-3 in 20K warming-up updates. Then it is fixed until 100 epochs. From then on, the learning rate shrinks every epoch with factor 0.95. All the models are trained using 32 Nvidia V100 GPUs with fp16 precision.

The output units are 1024 sentence piece with byte pair encoding (BPE) as the segmentation algorithm. For the predictor, the tokens are first represented by 256-dimensional embeddings before going through two LSTM layers with 512 hidden nodes, followed by a linear projection to 640-dimensional features before the joiner. For the joiner, the combined embeddings from the encoder and the predictor first go through a tan h activation and then another linear projection to the target number of sentence pieces. Both the LCBLSTM and the efficient memory transformer (Emformer) encoders were pre-trained from the hybrid model. Also, a neural network language model (NNLM) with three layers of LSTM with 2048 hidden nodes each was trained with the combined transcripts of the train set and the 800 M text-only set, for shallow fusion during beam search. The weight of NNLM probabilities was 0.3 across experiments.

The efficient memory transformer (Emformer) uses block processing in decoding, where the latency comes from the center block size and the look-ahead context size. For the most left frame in the center block, the latency is the center block size plus look-ahead context size. The latency for the most right frame in the center block is look-ahead context size. Therefore, the embodiments disclosed herein use algorithmic latency induced by the encoder (EIL), an average latency of all the frames in the center block, which equals the look-ahead context latency plus center block latency discounted by 0.5.

Table 1 gives performance comparison of AM-TRF with the efficient memory transformer (Emformer). Caching the key and value computation speeds up the training from 1.14 hours per epoch to 0.5 hours per epoch and decoding from RTF (real-time factor) 0.19 to 0.17. The left context caching also reduces the redundant gradient in training that results in some WER reduction. Finally, using all improvements, comparing with AM-TRF, the efficient memory transformer (Emformer) speeds up the training by 4.6 folders. The efficient memory transformer (Emformer) also gets relative WER reduction 17% on test-clean, 9% on test-other, and 10% relative RTF reduction in decoding.

TABLE 1

From AM-TRF to the efficient memory transformer (Emformer). All models have 80M parameters. Left context size, center block size and right context size are 640 ms, 1280 ms and 320 ms.

| Model | RTF | test clean | other | train hours per epoch |
|---|---|---|---|---|
| AM-TRF-24L | 0.19 | 3.27 | 6.66 | 1.14 h |
| +left context caching | 0.17 | 2.88 | 6.44 | 0.50 h |
| Emformer-24L | 0.17 | 2.72 | 6.01 | 0.25 h |

TABLE 2

Impact of left context (LC) size (in millisecond) on word error rate and RTF under medium latency constraints. Look-ahead size is 320 ms, the EIL is 640 ms or 960 ms when center size is 640 ms and 1280 ms, respectively. Both LCBLSTM and Emformer-24L have the similar 80M parameters. Emformer-36L has 120M parameters.

| Model | LC size | Center Size | test clean | other | RTF |
|---|---|---|---|---|---|
| LCBLSTM | — | 1280 | 2.90 | 6.76 | 0.30 |
|  | — | 640 | 2.96 | 6.97 | 0.30 |
| Emformer-24L | 320 | 1280 | 2.75 | 6.08 | 0.17 |
|  | 640 |  | 2.72 | 6.01 | 0.17 |
|  | 1280 |  | 2.59 | 5.90 | 0.17 |
|  | 320 | 640 | 2.80 | 6.47 | 0.17 |
|  | 640 |  | 2.78 | 6.46 | 0.17 |
|  | 1280 |  | 2.76 | 6.59 | 0.18 |
| Emformer-36L | 1280 | 1280 | 2.58 | 5.75 | 0.19 |
| +smbr |  |  | 2.50 | 5.62 | 0.17 |
| Emformer-36L | 1280 | 640 | 2.69 | 6.14 | 0.21 |
| +smbr |  |  | 2.62 | 5.97 | 0.19 |

Table 2 and Table 3 presents the performance of the efficient memory transformer (Emformer) based hybrid systems for medium latency and low latency, respectively. For both tables, larger left context size gives better WER and slightly worse decoding RTF. In Table 2, LCBLSTM consists of 5 layers with 800 nodes in each layer each direction. Using a similar model size and latency constraint, the efficient memory transformer (Emformer) gets a relative 44% RTF deduction. Under EIL 1280 ms, the efficient memory transformer (Emformer) obtained over relative 12% WER reduction over LCBLSTM on both test-clean and test-other datasets. Together with SMBR training, the efficient memory transformer (Emformer) with 120 M parameters achieves WER 2.50% on test-clean and 5.62% on test-other under EIL 960 ms, and on test-clean and on test-other under EIL 640 ms.

In Table 3, the LSTM consists of 8 layers with 1200 nodes in each layer. The input to LSTM is a concatenation of the current frame with the look-ahead context frames. Low latency speech recognition gives higher RTF than medium latency speech recognition. Because medium latency speech recognition chunks an utterance into fewer larger segments, it speeds up the neural network forward computation. Using a similar model size and latency constraint, the efficient memory transformer (Emformer) gets a relative 30% RTF deduction. Using the same latency, the efficient memory transformer (Emformer) gets relative WER reduction 9% and 15% on test-clean and test-other, respectively. Together with SMBR training, the efficient memory transformer (Emformer) with 36 layers achieves WER 3.01% on test-clean and 7.09% on test-other. According to our knowledge, for low latency 80 ms, the efficient memory transformer (Emformer) gives the best results on Librispeech data.

TABLE 3

Impact of left context (LC) size (in millisecond) on word error rate and RTF under a low latency constraint. The look-ahead and center context size are 40 ms and 80 ms, respectively. EIL is 80 ms. Both LSTM and Emformer-24L have the similar 80M parameters. Emformer-36L has 120M parameters.

| Model | LC Size | test clean | test other | RTF |
| --- | --- | --- | --- | --- |
| LSTM | — | 3.75 | 9.18 | 0.46 |
| Emformer-24L | 320 | 3.44 | 8.37 | 0.31 |
|  | 640 | 3.37 | 8.05 | 0.31 |
|  | 1280 | 3.41 | 7.75 | 0.32 |
| Emformer-36L | 1280 | 3.32 | 7.56 | 0.47 |
| +smbr |  | 3.01 | 7.09 | 0.46 |

Table 4 summarizes the comparison between LCBLSTM and the efficient memory transformer (Emformer) as encoders in the transducer system. Similar to the previous observations from experiments with hybrid systems, we see that given the same EIL (640 ms), the efficient memory transformer (Emformer) consistently outperforms LCBLSTM on word error rates. With the external NNLM, the transducer systems achieved similar word error rates to those from hybrid systems.

TABLE 4

Word error rate of the efficient memory transformer (Emformer) with neural transducer. Both models use a segment size of 640 ms and a right context size of 640 ms, thus induces the same algorithmic latency (EIL) of 640 ms.

| Model | NNLM | LC size (ms) | test clean | test other | RTF |
| --- | --- | --- | --- | --- | --- |
| LCBLSTM | x | — | 3.04 | 8.25 | — |
|  | ✓ | — | 2.65 | 7.26 |  |
| Emformer-24L | x | 1280 | 2.78 | 6.92 | — |
|  | ✓ |  | 2.37 | 6.07 |  |

Figure 6:
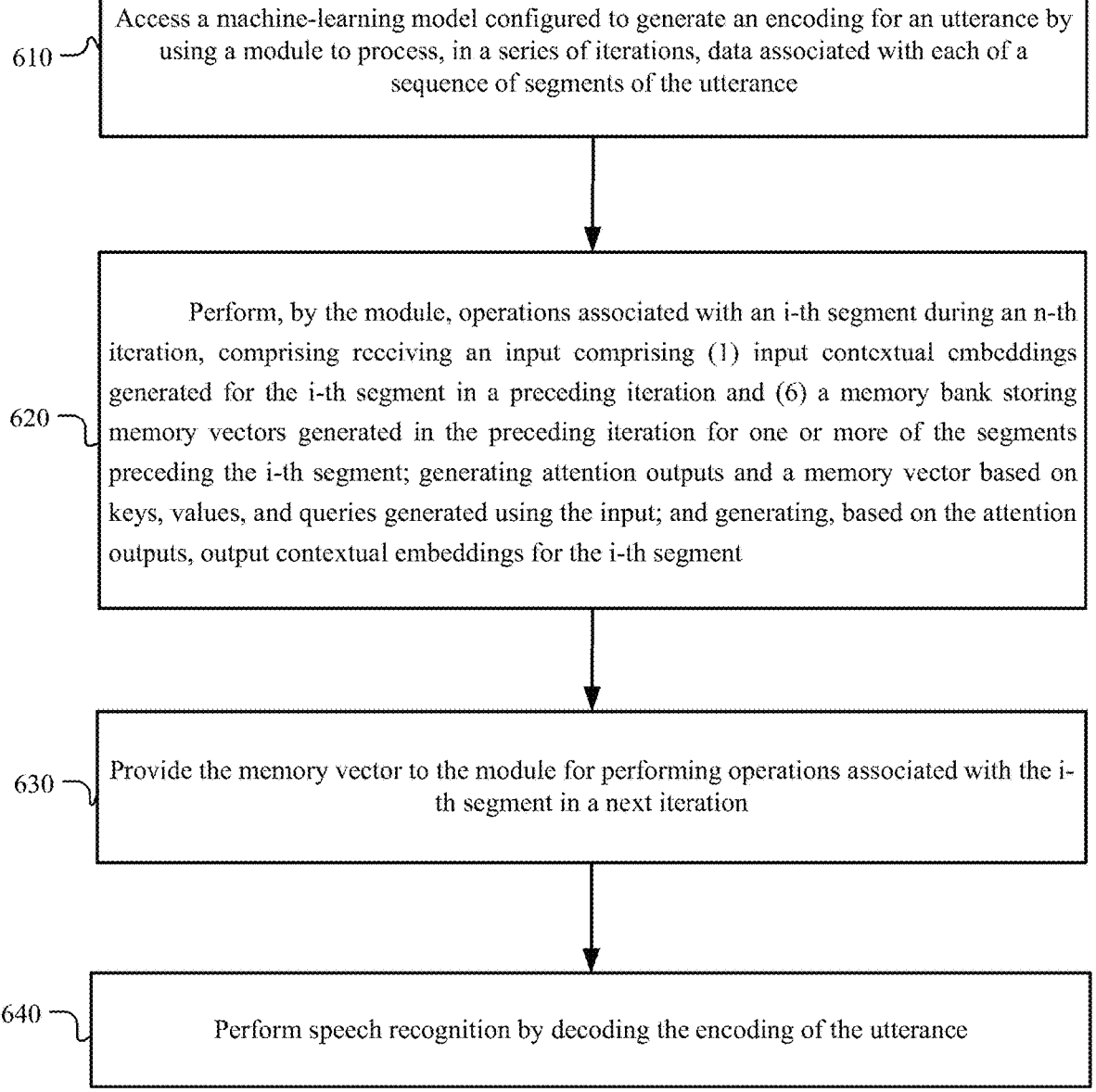
FIG. 6 illustrates an example method for low latency streaming speech recognition.

FIG. 6 illustrates an example method 600 for low latency streaming speech recognition. The method may begin at step 610, where the computing system may access a machine-learning model configured to generate an encoding for an utterance by using a module to process, in a series of iterations, data associated with each of a sequence of segments of the utterance. At step 620, the computing system may perform, by the module, operations associated with an i-th segment during an n-th iteration, comprising receiving an input comprising (1) input contextual embeddings generated for the i-th segment in a preceding iteration and (2) a memory bank storing memory vectors generated in the preceding iteration for one or more of the segments preceding the i-th segment; generating attention outputs and a memory vector based on keys, values, and queries generated using the input; and generating, based on the attention outputs, output contextual embeddings for the i-th segment. At step 630, the computing system may provide the memory vector to the module for performing operations associated with the i-th segment in a next iteration. At step 640, the computing system may perform speech recognition by decoding the encoding of the utterance. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for low latency streaming speech recognition including the particular steps of the method of FIG. 6, this disclosure contemplates any suitable method for low latency streaming speech recognition including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
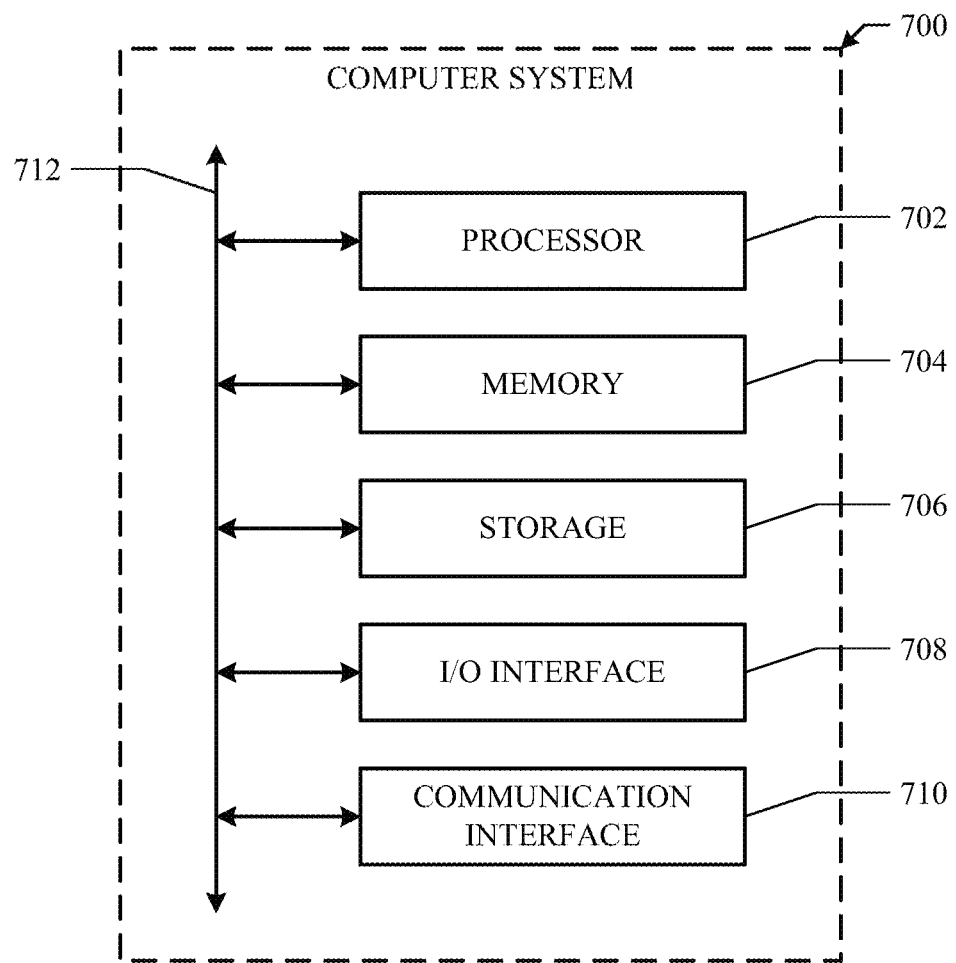
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing systems:
   accessing a machine-learning model configured to generate an encoding for an utterance by using a module to process, in a series of hierarchical layers associated with the module, data associated with each of a sequence of segments of the utterance;
   performing, by the module, operations associated with an i-th segment during an n-th iteration layer of the series of hierarchical layers, comprising:
      receiving an input comprising (1) input contextual embeddings generated for the i-th segment in a preceding lower layer of the series of hierarchical layers and (2) a memory bank storing memory vectors generated in the preceding lower layer for one or more of the segments preceding the i-th segment, wherein the one or more of the segments exclude the i-th segment, and wherein each memory vector is determined based on an attention operation based on each of the one or more of the segments preceding the i-th segment;
      generating attention outputs and a memory vector based on keys, values, and queries generated using the input; and
      generating, based on the attention outputs, output contextual embeddings for the i-th segment;
   providing the memory vector to the module for performing operations associated with the i-th segment in a next higher layer of the series of hierarchical layers; and
   performing speech recognition by decoding the encoding of the utterance.

2. The method of claim 1, wherein the input contextual embeddings for the i-th segment during the n-th layer comprises an embedding representing the i-th segment generated in the preceding lower layer and an embedding representing a right context block associated with the i-th segment generated in the preceding lower layer.

3. The method of claim 2, further comprising:
   making a copy of the embedding representing the right context block; and
   putting the copy at a beginning of the received input.

4. The method of claim 1, wherein generating the output contextual embeddings is based on a point-wise feed-forward network.

5. The method of claim 1, wherein the output contextual embeddings for the i-th segment during the n-th layer comprises an embedding representing the i-th segment generated in the n-th layer and an embedding representing a right context block associated with the i-th segment generated in the n-th layer.

6. The method of claim 1, wherein the output contextual embeddings for the i-th segment during the n-th layer are input contextual embeddings for the i-th segment during the next higher layer.

7. The method of claim 1, generating the encoding for the utterance comprising:
after the series of hierarchical layers, identifying, from output contextual embeddings for each segment of the utterance, an embedding representing the segment; and
combining the identified embeddings of the segments of the utterance.

8. The method of claim 1, further comprising:
after the n-th layer, updating the memory bank by adding the memory vector generated during the n-th layer.

9. The method of claim 1, further comprising:
generating a summary vector for the i-th segment during the n-th layer, wherein the summary vector is based on a mean of the i-th segment; and
assigning a zero attention-weight between the summary vector and the memory bank.

10. The method of claim 1, wherein the keys comprise at least a key carried over from one or more segments preceding the i-th segment.

11. The method of claim 1, wherein the values comprise at least a value carried over from one or more segments preceding the i-th segment.

12. One or more computer-readable non-transitory storage media embodying software that is operable when executed to:
access a machine-learning model configured to generate an encoding for an utterance by using a module to process, in a series of hierarchical layers associated with the module, data associated with each of a sequence of segments of the utterance;
perform, by the module, operations associated with an i-th segment during an n-th layer of the series of hierarchical layers, comprising:
receiving an input comprising (1) input contextual embeddings generated for the i-th segment in a preceding lower layer of the series of hierarchical layers and (2) a memory bank storing memory vectors generated in the preceding lower layer for one or more of the segments preceding the i-th segment, wherein the one or more of the segments exclude the i-th segment, and wherein each memory vector is determined based on an attention operation based on each of the one or more of the segments preceding the i-th segment;
generating attention outputs and a memory vector based on keys, values, and queries generated using the input; and
generating, based on the attention outputs, output contextual embeddings for the i-th segment;
provide the memory vector to the module for performing operations associated with the i-th segment in a next higher layer of the series of hierarchical layers; and
perform speech recognition by decoding the encoding of the utterance.

13. The media of claim 12, wherein the input contextual embeddings for the i-th segment during the n-th layer comprises an embedding representing the i-th segment generated in the preceding lower layer and an embedding representing a right context block associated with the i-th segment generated in the preceding lower layer.

14. The media of claim 13, wherein the software is further operable when executed to:
make a copy of the embedding representing the right context block; and
put the copy at a beginning of the received input.

15. The media of claim 12, wherein generating the output contextual embeddings is based on a point-wise feed-forward network.

16. The media of claim 12, wherein the output contextual embeddings for the i-th segment during the n-th layer comprises an embedding representing the i-th segment generated in the n-th layer and an embedding representing a right context block associated with the i-th segment generated in the n-th layer.

17. A system comprising: one or more processors; and a non-transitory memory coupled to the processors comprising instructions executable by the processors, the processors operable when executing the instructions to:
access a machine-learning model configured to generate an encoding for an utterance by using a module to process, in a series of hierarchical layers associated with the module, data associated with each of a sequence of segments of the utterance;
perform, by the module, operations associated with an i-th segment during an n-th layer of the series of hierarchical layers, comprising:
receiving an input comprising (1) input contextual embeddings generated for the i-th segment in a preceding lower layer of the series of hierarchical layers and (2) a memory bank storing memory vectors generated in the preceding lower layer for one or more of the segments preceding the i-th segment, wherein the one or more of the segments exclude the i-th segment, and wherein each memory vector is determined based on an attention operation based on each of the one or more of the segments preceding the i-th segment;
generating attention outputs and a memory vector based on keys, values, and queries generated using the input; and
generating, based on the attention outputs, output contextual embeddings for the i-th segment;
provide the memory vector to the module for performing operations associated with the i-th segment in a next higher layer of the series of hierarchical layers; and
perform speech recognition by decoding the encoding of the utterance.

18. The system of claim 17, wherein the input contextual embeddings for the i-th segment during the n-th layer comprises an embedding representing the i-th segment generated in the preceding lower layer and an embedding representing a right context block associated with the i-th segment generated in the preceding lower layer.

19. The system of claim 18, wherein the processors are further operable when executing the instructions to:
make a copy of the embedding representing the right context block; and
put the copy at a beginning of the received input.

20. The system of claim 17, wherein generating the output contextual embeddings is based on a point-wise feed-forward network.

* * * * *